Dec. 29, 1931.  H. F. FISHER  1,838,926
ELECTRICAL TREATER
Original Filed June 23, 1927
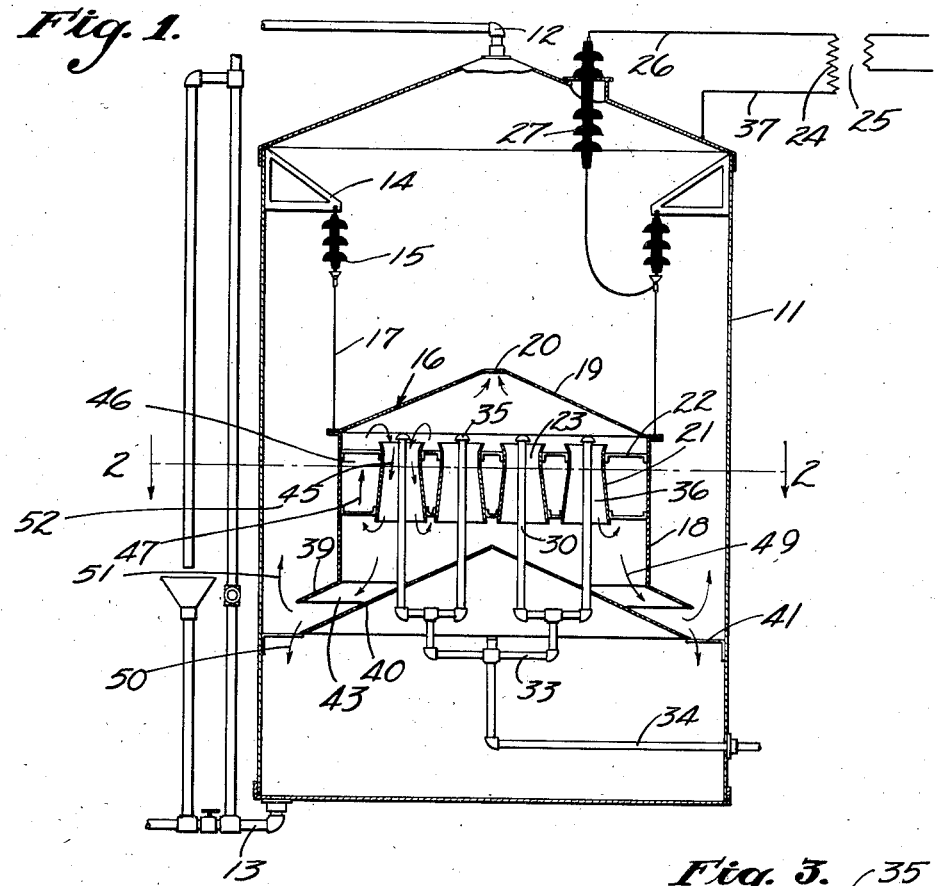
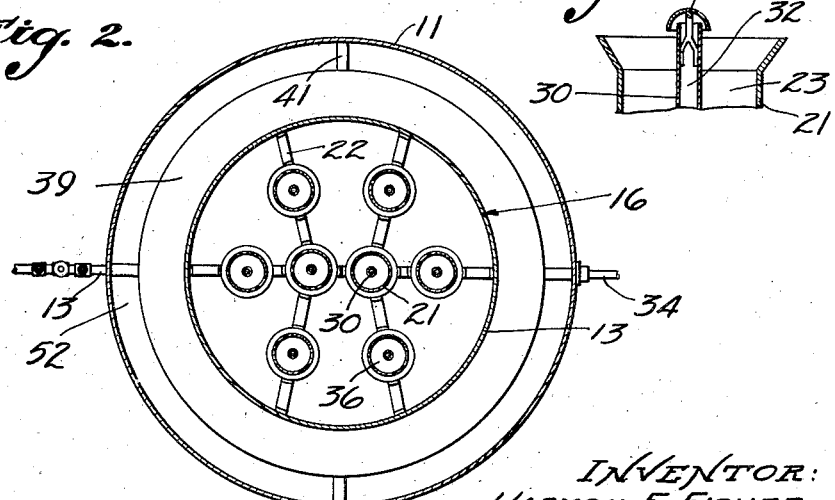
INVENTOR:
HARMON F. FISHER
BY
ATTORNEY.

Patented Dec. 29, 1931

1,838,926

UNITED STATES PATENT OFFICE

HARMON F. FISHER, OF LONG BEACH, CALIFORNIA, ASSIGNOR TO PETROLEUM RECTIFYING COMPANY OF CALIFORNIA, OF LOS ANGELES, CALIFORNIA, A CORPORATION OF CALIFORNIA

ELECTRICAL TREATER

Application filed June 23, 1927, Serial No. 200,877. Renewed September 29, 1931.

This invention relates to dehydrators for treating an emulsion so that the phases thereof may be separated.

My invention is adapted for treating many types of emulsions such as water-in-oil emulsions, and it has a particular utility in the oil-producing industry for treating petroleum emulsion. In the following description I will describe my invention in this use, but it should be understood that I do not thereby limit myself.

The ordinary type of dehydrator used principally in the oil-producing industry consists of a tank in which a pair of electrodes are placed. These electrodes are spaced so as to provide a treating zone and are connected in an electric circuit so that an electric field may be impressed upon the treating zone. Emulsion, which in the oil-producing industry is a water-in-oil emulsion, is introduced into the tank and is passed between the electrodes where it is subjected to the action of the electric field. The electric field acts upon the emulsion in such a manner as to coalesce the dispersed phase or the water particles into masses of such a size that they will gravitate from the oil.

In this system of dehydrating emulsions, my experiments have proved to me that globules of emulsion or water droplets carry appreciable residual electrical charges for a considerable period of time after having been passed through an intense electrical treating field. When an alternating voltage field is used (as is most generally the case in the dehydration of petroleum emulsions) it is found that these charged droplets possess charges of both polarities. Given the proper conditions, these charged particles agglomerate and settle of their own weight. I find that under the influence of a superimposed electrical field in the settling zone of the dehydrator, this agglomeration of the charged particles is greatly expedited. Such a result is obtained by causing the treated emulsion to flow through or between suitably placed charged settling plates or barriers properly spaced apart so that no short-circuiting chains of water particles will be set up between them.

It is accordingly one of the objects of my invention to provide a dehydrator in which the treated emulsion is subjected to such conditions that the coalesced particles of the dispersed phase of the emulsion will settle quickly from the continuous phase.

In the past, certain types of dehydrators were inefficient for the reason that the water particles would chain up between the electrodes, thus forming short-circuiting paths. Electricity would then flow across the treating space and greatly reduce the strength of the electric field. In certain of my copending applications, for example, see my application entitled Dehydrator with high field intensity grounded electrode, filed September 16, 1926, Serial No. 135,804, and Dehydrator with means for directing emulsion through high intensity field, filed July 2, 1927, Serial No. 203,253, I have disclosed the idea of forming a dielectric barrier adjacent to one of the electrodes, which dielectric barrier prevents a chaining of water particles entirely across the treating zone and consequently prevents a diminution of the strength of the electric field. I find it very satisfactory to use dry oil as a dielectric barrier. This dry oil is preferably circulated around the electrode of lowest field intensity. I find that the oil in active circulation around the electrode of lowest field intensity may carry in suspension considerable quantities of water which have not had time to settle out and which may cause a so-called "lining-up" action between the electrode of lowest field intensity and parts of the dehydrator of opposite potential, such as the shell of the dehydrator. I have found that short-circuiting of this character may be eliminated by providing a shroud or shield around the electrode of lowest field intensity, of the same potential as this electrode, and forming a neutral passage for the circulating oil.

It is accordingly one of the important objects of my invention to provide a dehydrator in which short-circuiting of water particles carried by the actively circulated oil will be eliminated.

A still further object of the invention is to provide a dehydrator of novel construction as will be pointed out hereinafter.

Other objects and advantages of the invention will be made evident hereinafter.

Referring to the drawings in which a preferred form of the invention is illustrated:

Fig. 1 is a vertical section.

Fig. 2 is a horizontal section taken on the line 2—2 of Fig. 1.

Fig. 3 is a fragmentary view showing an emulsion inlet means of the invention.

The form of the invention illustrated in the drawings has a tank 11 provided with an oil outlet 12 and a water outlet 13. Brackets 14 are mounted in the upper part of the shell 11, which brackets carry insulators 15. The insulators 15 support a shroud 16 by means of cables 17. The shroud 16 consists of a cylinder 18 and a conical top 19 having a central opening 20. Supported within the shroud 16 is a plurality of live or surrounding electrodes 21, these electrodes 21 being supported by suitable brace arms 22. It should be noted that the surrounding electrodes 21 are open at both ends and are provided with neck portions 23 near their upper ends, this construction forming an electrode in the shape of a Venturi-tube, such an electrode being hereinafter termed a "Venturi-tube electrode". The shroud and live electrodes are connected to a secondary winding 24 of a transformer 25 by means of a conductor 26 which is extended to the interior of the shell 11 through an inlet bushing 27, and connected to one of the cables 17.

Extending centrally through each of the surrounding electrodes 21 is a grounded or central electrode 30. The central electrodes 30 are in the form of pipes, as shown, and provide passages 32 (Fig. 3). The central electrodes 30 are supported by pipes 33 which are connected to an emulsion inlet pipe 34. At the upper ends of the central electrodes 30 are directing means in the form of covers 35 which direct the emulsion passing through the passages 32 downward through treating spaces or treating zones 36 provided inside the surrounding electrodes 21 and around the central electrodes 30. The secondary winding 24 is connected to the shell 11 by means of a conductor 37 so that the grounded electrodes or central electrodes 30 are connected to the grounded potential side of the secondary of the transformer.

At the lower end of the shroud 16 is an outward extending skirt or settling plate 39, and supported below it is a member in the form of a conical settling plate 40. The conical settling plate 40 is supported by brackets 41 and is provided with openings through which the electrodes 30 extend. A settling space 43 is provided between the plates 39 and 40, through which settling space treated emulsion may pass.

When the treater is set into operation it is preferable to fill it with a dry oil. Emulsion is then supplied through the inlet pipe 34, this emulsion passing through the pipes 33 and through passages 32 of the central electrodes 30. This emulsion passes from the upper ends of the central electrodes and is directed downward through the treating zone 36 by means of the directing means 35. At this time the transformer is being energized and an electric field is established in the treating zone. The emulsion passes downward through the treating zone as indicated by arrows 45. As pointed out in my copending application entitled Dehydrator with means for directing emulsion through a high intensity field, supra, the most efficient treating takes place in the space which envelops the central electrodes 30 and where the intensity of the field is the greatest. In its passage through the treating zone the water particles or the dispersed phase of the emulsion are coalesced into particles of sufficient mass to gravitate from the oil or the continuous phase of the emulsion. Surrounding the electrodes 21 is a neutral passage 46 provided by the shroud 16. Part of the oil of the treated emulsion passes upward through the neutral passage, as indicated by arrows 47, and is pulled into the upper ends of the treating zone 36 by the injector action of the incoming emulsion. This circulation of substantially dry oil provides a dielectric barrier which eliminates short-circuiting in the treating zone 36. Experiments have shown, however, that there is a tendency for the dry oil to carry small particles of water. There will be no short-circuiting in the passage 46 because this passage is neutral, there being no field therein and consequently no short-circuiting conditions.

A portion of the treated emulsion passes downward as indicated by arrows 49 and through the settling space 43, this settling space having an electric field established therein. Ordinarily, considerable time is required for the agglomerated water particles to settle from the oil. The action of the electric field on the treated emulsion is of such a nature that the settling out of the suspended water particles is made more rapid. Experiments have shown that there is little or no so-called treating action taking place in the settling zone, this being probably because of the fact that the emulsion has already been broken up by a high intensity field in its passage through the treating zones 36 and is therefore somewhat in a stable condition. The emulsion passes from the settling space or settling zone 43, and the water particles precipitate as indicated by arrows 50, whereas the dry oil passes upward as indicated by arrows 51 through a space 52 inside the tank 11 and around the shroud 16, being conducted from the upper part of the tank 11 by means of the pipe 12.

There are various features of this invention which are worthy of reiteration. In the first place, the feature of preventing short-circuiting of any water particles carried by the actively circulated oil is a valuable asset to the invention. This is accomplished by providing the shroud 16 which is of the same potential as the surrounding electrodes 21, thus providing the neutral passage 46. It will be seen that without the shroud 16 an electric field would be established between the surrounding electrodes 21 and the shell 11 and there would, therefore, be a tendency for any water particles in the actively circulated oil to chain up. There is an electric field set up between the shroud 16 and the shell 11, but in view of the fact that the oil passing through the space 52 is very dry there are no water particles to chain up.

Another important feature of the invention is the treating of the treated emulsion so as to cause the water particles to quickly settle from the oil. This is accomplished by providing the plates 39 and 40 of different potentials between which an electric field is established. The emulsion which has been treated, as previously pointed out, is passed through the settling space 43 wherein the water particles are acted upon so that they will readily separate from the oil.

It should be understood that various modifications may be made without departing from the metes and bounds of this invention.

This application is an improvement on the apparatus disclosed in my copending applications Serial No. 233,291, filed November 14, 1927, and Serial No. 286,660, filed June 19, 1928.

I claim as my invention:

1. A dehydrator comprising: a grounded tank; an inner grounded electrode in said tank; a surrounding live electrode around said inner electrode, there being a treating space between said electrodes into which an emulsion is introduced; means for establishing an electric field between said inner and surrounding electrodes; a shroud surrounding said surrounding electrode, said shroud being at substantially the same potential as said surrounding electrode; and a conical settling plate electrically connected to said tank and extending thereacross beneath said shroud.

2. A dehydrator comprising: a tank; an inner electrode in said tank; a surrounding electrode around said inner electrode, there being a treating space between said electrodes into which an emulsion is introduced; means for establishing an electric field between said inner and surrounding electrodes; a shroud surrounding said surrounding electrode, said shroud being at substantially the same potential as said surrounding electrode; and means cooperating with said shroud in providing a settling space to which treated emulsion from said treating space is delivered, said settling space having an electric field set up therein.

3. A dehydrator comprising: a tank; a plurality of inner electrodes in said tank; a plurality of sleeve-shaped surrounding electrodes, one of said surrounding electrodes surrounding each of said inner electrodes to define a plurality of treating spaces open at their ends; means for establishing electric fields between said inner and surrounding electrodes; a shroud surrounding all of said electrodes, said shroud being at substantially the same potential as said surrounding electrodes and cooperating with said surrounding electrodes to define an equipotential circulating space communicating with opposite ends of said treating spaces; and means for directing emulsion into the spaces between said inner and surrounding electrodes.

4. A dehydrator comprising: a tank; a plurality of inner electrodes in said tank; a plurality of surrounding electrodes, one of said surrounding electrodes surrounding each of said inner electrodes; means for establishing electric fields between said inner and surrounding electrodes; a shroud surrounding all of said electrodes, said shroud being at substantially the same potential as said surrounding electrodes; means for directing emulsion into the spaces between said inner and surrounding electrodes; and means providing a settling space to which treated emulsion from said treating space is delivered, said settling space having an electric field set up therein.

5. A dehydrator comprising: an electrode of relatively extensive area; an electrode of relatively small area, said electrodes defining an intermediate treating space; means for establishing in said treating space an electric field having a high field intensity portion adjacent said small electrode and a relatively low field intensity portion adjacent said larger electrode; means for introducing fluid into the high field intensity portion of said treating space; and means providing a neutral equipotential passage around said electrode of relatively extensive area and directly communicating with opposite ends of said treating space so that a portion of the treated fluid may be returned through said neutral space to pass through the low field intensity portion of the treating space.

6. A dehydrator comprising: a tank; a Venturi-tube electrode; an inner electrode longitudinally disposed within said Venturi-tube electrode, said Venturi-tube electrode and said inner electrode defining a treating space; means for establishing in said treating space an electric field the intensity of which is greatest adjacent said inner electrode; means for discharging emulsion under pressure into the throat of said Venturi-tube electrode and along said inner electrode through the zone of greatest field intensity; and a shroud surrounding and of the same potential as said Venturi-tube electrode, said shroud and said Venturi-tube electrode defining a neutral passage communicating with the intake and discharge ends of said treating space so that a portion of the treated emulsion will be drawn from said neutral passage into the intake end of said treating space to flow along the inner surface of said tube through the zone of lowest field intensity.

7. A dehydrator comprising: a tank; a plurality of Venturi-tube electrodes; a plurality of inner electrodes, each disposed longitudinally within one of said Venutri-tube electrodes, each Venturi-tube electrode and each companion inner electrode defining a treating space; means for establishing in the several treating spaces electric fields of greatest intensity adjacent the respective inner electrodes; means for discharging emulsion under pressure into the throat of each Venturi-tube electrode and along the associated inner electrode through the adjacent zone of greatest field intensity; and a shroud surrounding and of the same field potential as the several Venturi-tube electrodes, said shroud and the several Venturi-tube electrodes defining intermediate neutral passages communicating with the intake and discharge ends of the treating spaces so that a portion of the treated emulsion will be drawn from said neutral passages into the intake ends of the treating spaces to flow along the inner surfaces of said Venturi-tube electrodes and through the zone of lowest intensity therein.

8. A dehydrator comprising: a tank, an inner electrode in said tank; a surrounding electrode around said inner electrode; a shroud surrounding said surrounding electrode, said surrounding and said inner electrode defining an inner treating space into which an emulsion is introduced, said shroud and said tank defining an outer treating space; and means for establishing an electric field in each of said treating spaces, said surrounding electrode and said shroud being of substantially the same potential to provide an intermediate neutral passage through which a portion of the treated emulsion may move.

9. A dehydrator comprising: primary and secondary electrodes defining a treating space therebetween into which an emulsion to be treated is directed; a shroud around but spaced from said primary electrode and electrically connected thereto to define an equipotential circulating space; and a member adjacent a portion of said shroud and electrically connected to said secondary electrode, said shroud and said member cooperating to define a settling space communicating with said equipotential circulating space and through which at least a portion of the treated emulsion passes.

10. A dehydrator comprising: a tank; a shroud electrically insulated from said tank, there being an opening in the top of said shroud communicating with the top of said tank; a primary electrode electrically connected to said shroud but spaced a distance therefrom to form a neutral space therebetween; a secondary electrode supported in spaced relationship relative to said primary electrode in a manner to form a treating space therebetween into which the emulsion to be treated is introduced, said treating space communicating with said neutral space; a settling plate supported in said tank adjacent a portion of said shroud and electrically connected to said secondary electrode; and means for establishing a difference of potential between said primary and secondary electrodes in a manner to set up an electric field in said treating space and in a settling space between said shroud and said plate.

11. A treater comprising: a tank; a grounded electrode in said tank; a live electrode in said tank, there being a treating space between said electrodes; means for establishing a difference in potential between said electrodes; a shroud electrically connected to said live electrode; another member electrically connected to and extending inward from a section adjacent the walls of said tank and vertically spaced from said shroud to provide a settling space in communication with one end of said treating space; and means for passing a fluid through said spaces in succession.

12. A treater comprising: a grounded electrode; a live electrode, there being a treating space between said electrodes; means for establishing a difference in potential between said electrodes; a member electrically connected to said live electrode; another member electrically connected to said grounded electrode, said members providing a settling space; a shroud defining a space interconnecting one end of said treating space and one end of said settling space; means for passing an emulsion through said treating space and into said space defined by said shroud where a partial separation of the phases of said emulsion may take place, said last-named means forcing a portion of the treated but unseparated emulsion from said space defined by said shroud and into said settling space.

In testimony whereof, I have hereunto set my hand at Borger, Texas, this 14th day of June, 1927.

HARMON F. FISHER.